United States Patent
Yoshimura et al.

(10) Patent No.: US 10,605,368 B2
(45) Date of Patent: Mar. 31, 2020

(54) SEALING APPARATUS

(71) Applicant: NOK CORPORATION, Tokyo (JP)

(72) Inventors: Kenichi Yoshimura, Kanagawa (JP); Yuki Sato, Fukushima (JP); Nobuaki Yanagisawa, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 27 days.

(21) Appl. No.: 15/804,171

(22) Filed: Nov. 6, 2017

(65) Prior Publication Data
US 2018/0058587 A1    Mar. 1, 2018

Related U.S. Application Data

(63) Continuation of application No. PCT/JP2016/063654, filed on May 6, 2016.

(30) Foreign Application Priority Data

May 11, 2015 (JP) ................................. 2015-096239

(51) Int. Cl.
*F16J 15/3232* (2016.01)
*F16J 15/3244* (2016.01)
(Continued)

(52) U.S. Cl.
CPC ........ *F16J 15/3232* (2013.01); *C10M 169/02* (2013.01); *F02F 7/00* (2013.01);
(Continued)

(58) Field of Classification Search
CPC .... F16J 15/3232; F16J 15/3204; F16J 15/324; F16J 15/3236; F16J 15/3244; F02F 7/00;
(Continued)

(56) References Cited

U.S. PATENT DOCUMENTS 4,550,920 A * 11/1985 Matsushima ........ F16J 15/3244
277/559
6,831,383 B2 * 12/2004 Poon ........................ A47L 5/22
277/559
(Continued)

FOREIGN PATENT DOCUMENTS

CN  1890495 A   1/2007
CN  203823070 U  9/2014
(Continued)

OTHER PUBLICATIONS

International Search Report for corresponding International Application No. PCT/JP2016/063654 dated Jun. 7, 2016.
(Continued)

*Primary Examiner* — Nathan Cumar
(74) *Attorney, Agent, or Firm* — Pearne & Gordon LLP

(57) ABSTRACT

A sealing apparatus sealing a gap between two members mutually relatively rotatable about an axis in an internal combustion engine, the sealing apparatus comprises an elastic body portion. The elastic body portion is an elastic body including an annular attaching portion attached to one of the two members and centered about the axis, and a seal portion in close contact with another of the two members in a manner in which the other of the two members is slidable. The seal portion includes an annular seal lip portion centered about the axis and an annular dust lip centered about the axis on an atmospheric side on an opposite side of a sealed fluid side with respect to the seal lip portion. The seal lip portion includes a lip tip portion which is an annular projecting body projecting toward the axis and grease is applied to the seal lip portion. The grease contains at least one of a synthetic hydrocarbon oil and a mineral oil as a base oil and has a low temperature starting torque of 25 N·cm or less at −30° C.

4 Claims, 3 Drawing Sheets

(51) Int. Cl.
*C10M 169/02* (2006.01)
*F02F 7/00* (2006.01)
*F02F 11/00* (2006.01)
*F16J 15/324* (2016.01)

(52) U.S. Cl.
CPC ............. *F02F 11/00* (2013.01); *F16J 15/324* (2013.01); *F16J 15/3244* (2013.01); *C10M 2203/1025* (2013.01); *C10M 2205/0285* (2013.01); *C10M 2207/1256* (2013.01); *C10N 2220/022* (2013.01); *C10N 2230/06* (2013.01); *C10N 2230/36* (2013.01); *C10N 2240/02* (2013.01); *C10N 2250/10* (2013.01)

(58) Field of Classification Search
CPC .................. F02F 11/00; C10M 169/02; C10M 2203/1025; C10M 2205/0285; C10M 2207/1256; C10N 2220/022; C10N 2230/06; C10N 2230/36; C10N 2240/02; C10N 2250/10
USPC ......................................................... 277/562
See application file for complete search history.

(56) References Cited

U.S. PATENT DOCUMENTS

| | | | |
|---|---|---|---|
| 2002/0012485 A1 | 1/2002 | Zauner et al. | |
| 2007/0182104 A1* | 8/2007 | Matsui | F16J 15/3244 277/549 |
| 2012/0329695 A1* | 12/2012 | Beret | C10M 169/00 508/506 |
| 2014/0339775 A1* | 11/2014 | Yarimizu | F02F 7/00 277/353 |

FOREIGN PATENT DOCUMENTS

| | | |
|---|---|---|
| CN | 203906798 U | 10/2014 |
| JP | 2005-172061 A | 6/2005 |
| JP | 2011-094023 A | 5/2011 |
| JP | 2013-133902 A | 7/2013 |
| JP | 2015-048904 A | 3/2015 |
| JP | 2015-075180 A | 4/2015 |
| RU | 2052698 C1 | 1/1996 |
| RU | 74579 U1 | 7/2008 |
| WO | 2013/094251 A1 | 6/2013 |

OTHER PUBLICATIONS

Written Opinion for corresponding International Application No. PCT/JP2016/063654 dated Jun. 7, 2016.
English translation of the Written Opinion for corresponding International Application No. PCT/JP2016/063654 dated Jun. 7, 2016.
International Preliminary Report on Patentability for corresponding International Application No. PCT/JP2016/063654 dated Nov. 14, 2017.
Decision to Grant dated Oct. 16, 2018 in corresponding Russian Application No. 2017142762.
Canadian Office Action dated Oct. 29, 2018 for corresponding Application No. 2,985,453.
Notification of the First Office Action dated Oct. 29, 2018 for corresponding Chinese Application No. 201680026154.5.
Extended European Search Report for corresponding European Application No. 16792625.2 dated Jan. 15 ,2019.
Office Action dated Jul. 2, 2019 in the corresponding CN application No. 201680026154.5.
Third Office Action dated Jan. 6, 2020 for corresponding Chinese Application No. 201680026154.5 and English translation.
Notice of Reasons for Refusal Action dated Feb. 3, 2020 for corresponding Japanese Application No. 2017-517912 and English translation.

* cited by examiner

SEALING APPARATUS

CROSS REFERENCE TO RELATED APPLICATIONS

The present application is a continuation application of International Application No. PCT/JP2016/063654, filed on May 6, 2016, which claims priority to Japanese Patent Application No. 2015-096239, filed on May 11, 2015. The contents of these applications are incorporated herein by reference in their entirety.

BACKGROUND

Technical Field

The present disclosure relates to a sealing apparatus, and particularly relates to a sealing apparatus suitably usable for an internal combustion engine of a vehicle or a general-purpose machine in a low temperature environment.

Background Art

Conventionally, a sealing apparatus has been used in an engine of a vehicle such as an automobile to seal a gap between two mutually relatively rotating members. For example, the sealing apparatus is used to seal a gap between a rotating shaft such as a crankshaft and a casing through which this shaft is inserted.

When the sealing apparatus is installed in the gap between the shaft and the casing of the engine, a seal lip portion of the sealing apparatus contacts the shaft, and then, a sealed space is formed in the casing. At the contact portion between the seal lip portion of the sealing apparatus and the shaft, engine oil as a fluid to be sealed (hereinafter referred to as a sealed fluid) acts as a lubricant. The sealed fluid acts as a lubricant to thereby suppress wear of the seal lip portion of the sealing apparatus.

FIG. 3 is a diagram illustrating a schematic configuration of a conventional sealing apparatus. As illustrated in FIG. 3, in a conventional sealing apparatus 100, at an atmospheric side inclined surface 102 on the opposite side of a sealed fluid side in the seal lip portion 101, a plurality of projections (screw projections 103) extending obliquely with respect to an axis and arranged at equal intervals. When the shaft is rotated, the screw projections 103 act as a screw pump to prevent the sealed fluid from leaking to an atmospheric side. (For example, see Japanese Patent Application Publication No. 2005-172061).

However, in a low temperature environment where the sealed fluid is at a pour point or below, the sealed fluid does not flow when the engine starts. Thus, the sealed fluid does not circulate in the engine and is not supplied to the seal lip portion 101. Accordingly, the sealed fluid does not act as the lubricant for the seal lip portion 101, leading to lubrication failure of the seal lip portion 101 and progress in wear of the seal lip portion 101. The progress in wear of the seal lip portion 101 may result in wear of the screw projection 103 or a reduction of lip interference, which may deteriorate the pumping performance of the sealing apparatus 100 and may cause leakage of the sealed fluid.

In order to solve such problems, there can be considered a method of changing a sealed fluid for use in a low temperature environment to another sealed fluid having a lower pour point. However, the change of the sealed fluid may adversely affect other mechanisms of the engine, and thus the sealed fluid cannot be easily changed. Alternatively, there can be considered a method of changing the material of the sealing apparatus. However, the change of the material affects various properties such as heat resistance and pumping performance of the sealing apparatus, so it is difficult to change the material while maintaining the required properties of the sealing apparatus.

Consequently, there has been a demand for a sealing apparatus capable of improving wear resistance in a low temperature environment while maintaining the required properties of the sealing apparatus without adversely affecting the mechanisms of the engine.

The present disclosure is related to providing a sealing apparatus capable of suppressing wear of a seal lip portion in a low temperature environment.

SUMMARY

According to the present disclosure, a sealing apparatus sealing a gap between two members mutually relatively rotatable about an axis in an internal combustion engine, the sealing apparatus comprises: an elastic body portion which is an elastic body including an annular attaching portion attached to one of the two members and centered about the axis; and a seal portion in close contact with another of the two members in a manner in which the other of the two members is slidable. The seal portion comprises: an annular seal lip portion centered about the axis; and an annular dust lip centered about the axis on an atmospheric side on an opposite side of a sealed fluid side with respect to the seal lip portion. The seal lip portion comprises a lip tip portion which is an annular projecting body projecting toward the axis, and grease is applied to the seal lip portion. The grease contains at least one of a synthetic hydrocarbon oil and a mineral oil as a base oil and has a low temperature starting torque of 25 N/cm or less at −30° C.

In the sealing apparatus according to an aspect of the present disclosure, the grease is applied between the lip tip portion and the dust lip.

In the sealing apparatus according to an aspect of the present disclosure, the lip tip portion comprises: a sealed fluid side inclined surface which is an inclined surface on the sealed fluid side; an atmospheric side inclined surface which is an inclined surface on the atmospheric side; and a sliding surface contacting the other of the two members between the sealed fluid side inclined surface and the atmospheric side inclined surface in a manner in which the other of the two members is slidable, wherein the grease is applied to at least the sliding surface.

In the sealing apparatus according to an aspect of the present disclosure, the grease is applied to at least the sliding surface of the lip tip portion and the atmospheric side inclined surface.

Effects of Disclosure

According to a sealing apparatus of the present disclosure, grease is applied to a seal lip portion and thus can suppress wear of the seal lip portion due to sliding. In particular, the grease contains at least one of a synthetic hydrocarbon oil and a mineral oil as a base oil, has a low temperature starting torque of 25 N·cm or less at −30° C., and thus the fluidity of grease is high even in a low temperature environment. For this reason, in a low temperature environment, the grease is supplied to the sliding surface of the seal lip portion, thus suppressing wear of the seal lip portion in a low temperature environment. The suppression of wear of the seal lip portion can serve to prevent leakage of the sealed fluid.

According to a sealing apparatus of the present disclosure, grease is applied between the lip tip portion and the dust lip, thus facilitating supply of the grease to the sliding surface of the seal lip portion and suppressing wear of the seal lip portion in a low temperature environment.

According to a sealing apparatus of the present disclosure, grease is applied to at least the sliding surface of the lip tip portion, thus effectively suppressing wear of the seal lip portion in a low temperature environment.

According to a sealing apparatus of the present disclosure, grease is applied to at least the sliding surface and an atmospheric side inclined surface.

Grease is applied to the sliding surface and the grease applied to the atmospheric side inclined surface is supplied to the sliding surface of the seal lip portion, thus more continuously suppressing wear of the sliding surface in a low temperature environment.

DESCRIPTION OF EMBODIMENTS

Hereinafter, embodiments of the present disclosure will be described with reference to the accompanying drawings.

Figure 1:
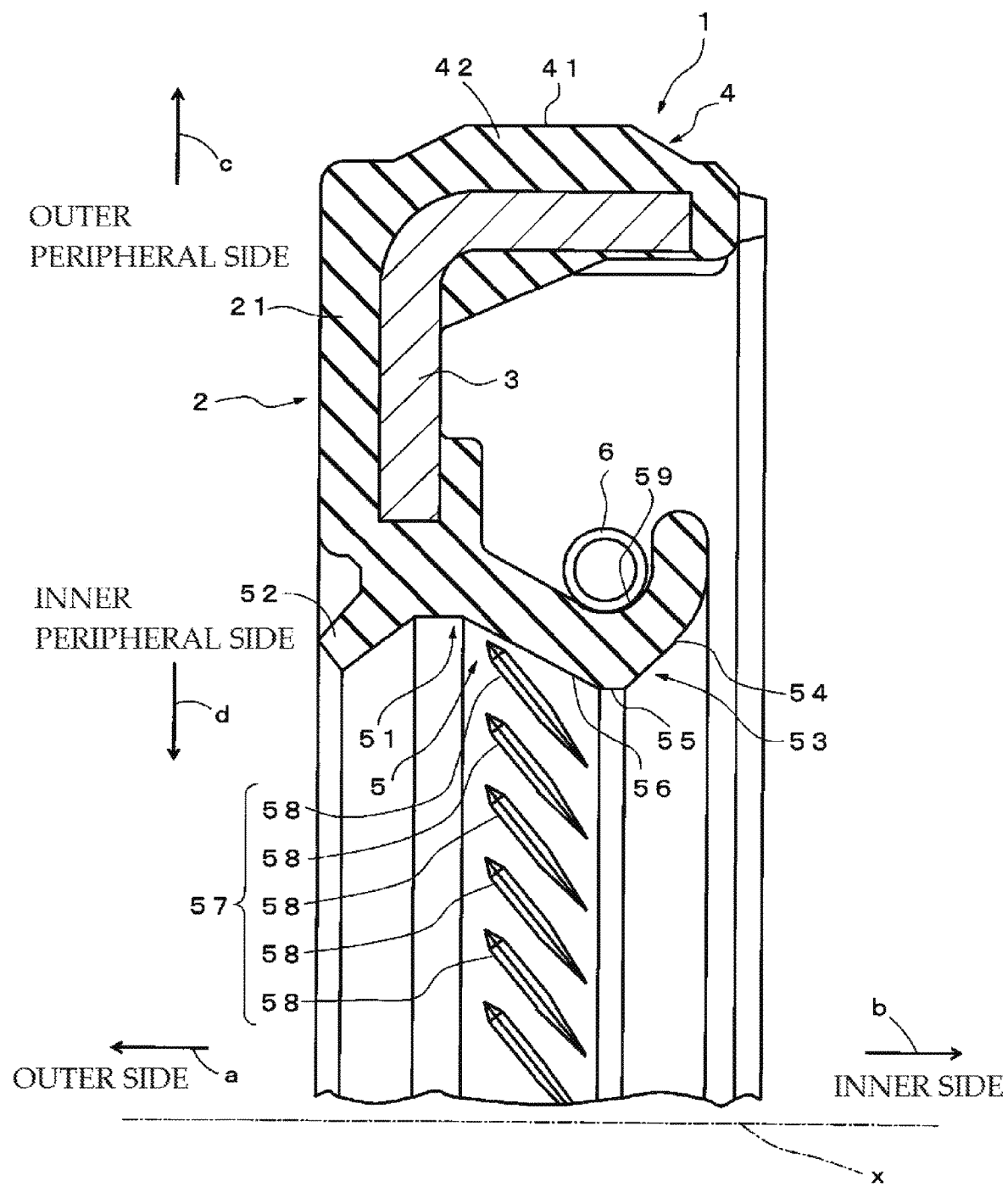
FIG. 1 is a sectional diagram taken along an axis of a sealing apparatus for illustrating a schematic configuration of the sealing apparatus according to an embodiment of the present disclosure.

FIG. 1 is a sectional diagram taken along an axis of a sealing apparatus for illustrating a schematic configuration of the sealing apparatus according to an embodiment of the present disclosure.

As illustrated in FIG. 1, a sealing apparatus 1 according to the embodiment of the present disclosure includes an elastic body portion 2 made of an annular elastic body and centered about an axis x; and a reinforcing ring 3 made of an annular metal and centered about the axis x. Examples of the elastic body of the elastic body portion 2 include various rubber materials. Examples of the various rubber materials include synthetic rubbers such as nitrile rubber (NBR), hydrogenated nitrile rubber (H-NBR), acrylic rubber (ACM), or fluorine rubber (FKM). Examples of the metal of the reinforcing ring 3 include stainless steel or SPCC (cold rolled steel sheet). The sealing apparatus 1 is used to seal a gap between two members mutually relatively rotatable about the axis x.

The elastic body portion 2 includes an attaching portion 4 fitted in an opening of a portion to be attached such as a casing or housing as one of the two mutually relatively rotatable members; and a seal portion 5 in close contact with an outer peripheral surface of the other of the two members such as a shaft to be inserted into the elastic body portion 2 in a manner in which the outer peripheral surface is slidable.

The attaching portion 4 is a cylindrical annular portion located on an outer peripheral side of the elastic body portion 2 and centered about the axis x. An outer peripheral surface 41 as a peripheral surface on the outer peripheral side of the attaching portion 4 is defined based on an interference portion 42 having a thickness (radial dimension) corresponding to the dimension of the unillustrated opening of the portion to be attached. For convenience of description, as used herein, the term "outer side" refers to a direction of arrow a (see FIG. 1) in a direction of the axis x, and the term "inner side" refers to a direction of arrow b (see FIG. 1) in the direction of the axis x. More specifically, in the usage state, the inner side refers to a direction (sealed fluid side) facing a region where the sealed fluid such as lubricating oil is present, and the outer side refers to a direction (atmospheric side) facing a region where the sealed fluid is not or should not be present. In addition, the term "outer peripheral side" refers to a direction (direction of arrow c in FIG. 1) away from the axis x in a direction perpendicular to the axis x, and the term "inner peripheral side" refers to a direction (direction of arrow d in FIG. 1) approaching the axis x.

The seal portion 5 is a cylindrical annular portion located on the inner peripheral side of the elastic body portion 2 and centered about the axis x. The seal portion 5 includes a seal lip portion 51 as illustrated in FIG. 1. Further, the seal portion 5 includes a dust lip portion 52 located on the outer side (atmospheric side) with respect to the seal lip portion 51. The dust lip portion 52 is provided to prevent foreign matter such as dust from entering a contact portion between the seal lip portion 51 and a shaft (unillustrated). As illustrated in FIG. 1, the dust lip portion 52 is an annular member centered about the axis x and extending obliquely from an inner peripheral side end portion of the seal portion 5 toward the outer side in the inner peripheral direction.

As illustrated in FIG. 1, the seal lip portion 51 includes a lip tip portion 53 located on an inner side portion on the inner peripheral side of the seal lip portion 51. As illustrated in FIG. 1, the lip tip portion 53 is an annular projection body whose shape of the cross section including the axis x (hereinafter may be simply referred to as a cross section) is a wedge shape projecting in the inner peripheral direction and centered about the axis x. More specifically, the lip tip portion 53 includes a sealed fluid side inclined surface 54, a sliding surface 55, and an atmospheric side inclined surface 56 in the order from the inner side (sealed fluid side). The above projection body is defined by the above surfaces 54 to 56.

The sealed fluid side inclined surface 54 is an inclined surface on the sealed fluid side. Specifically, as illustrated in FIG. 1, the sealed fluid side inclined surface 54 is an annular surface centered about the axis x and a conical surface (tapered surface) extending tapered in the direction of the axis x. The tapered surface of the sealed fluid side inclined surface 54 decreases in diameter as it progresses from the inner side toward the outer side in the direction of the axis x.

The atmospheric side inclined surface 56 is an inclined surface on the atmospheric side. Specifically, as illustrated in FIG. 1, the atmospheric side inclined surface 56 is an annular surface centered about the axis x and a conical surface (tapered surface) extending tapered in the direction of the axis x. The tapered surface of the atmospheric side inclined surface 56 increases in diameter as it progresses from the inner side toward the outer side in the direction of the axis x.

The sliding surface 55 is a cylindrical surface extending between the sealed fluid side inclined surface 54 and the atmospheric side inclined surface 56 contacting the unillustrated shaft in a manner such that the shaft is slidable.

The atmospheric side inclined surface 56 of the lip tip portion 53 includes a screw projection 57 which has a plurality of projections 58 whose tip ends reach the vicinity of the sliding surface 55. The plurality of projections 58 of the screw projection 57 are arranged in parallel with each other at predetermined intervals in the circumferential direction. The projections 58 are projections protruding in the inner peripheral direction and extending obliquely with respect to the axis x. The shape and size of the projection 58 are conventionally known and are not limited to the above-described shape and size.

Further, the lip portion 51 includes an annular recessed portion 59 located on an outer peripheral side surface facing the lip tip portion 53. In the recessed portion 59, an annular spring 6 of the sealing apparatus 1 is accommodated. The spring 6 urges the lip tip portion 53 in the inner peripheral direction.

In addition, as illustrated in FIG. 1, the elastic body portion 2 includes a disk portion 21 having a hollow disk shape and centered about the axis x. The disk portion 21 connects the attaching portion 4 and the seal portion 5 at each end portion thereof on the outer side.

The reinforcing ring 3 is an annular member having a substantially L-shaped cross section and centered about the axis x. As illustrated in FIG. 1, the reinforcing ring 3 is partially covered with the elastic body portion 2 and is integrated with the elastic body portion 2. In the present embodiment, a part of the inner side surface of the reinforcing ring 3 is exposed without being covered with the elastic body portion 2, but a part of the reinforcing ring 3 may be covered with the elastic body portion 2 or the whole of the reinforcing ring 3 may be covered with the elastic body portion 2 as long as the reinforcing ring 3 has a structure capable of reinforcing the elastic body portion 2.

The reinforcing ring 3 is manufactured by, for example, press working or forging, and most of the elastic body portion 2 is molded with a mold by cross-linking (vulcanization) to be described later. During the cross-linking molding, the reinforcing ring 3 is placed inside the mold, and then the elastic body portion 2 is adhered to the reinforcing ring 3 by cross-linking bonding, and then, the elastic body portion 2 is integrally molded with the reinforcing ring 3.

According to the sealing apparatus 1 of the present embodiment, grease G is applied to the seal lip portion 51. Specifically, the grease G is applied between the lip tip portion 53 and the dust lip portion 52. The grease G may be applied entirely between the lip tip portion 53 and the dust lip portion 52 or may be applied partially between the lip tip portion 53 and the dust lip portion 52. For example, the grease G may be applied only to the sliding surface 55 or may be applied only to the sliding surface 55 and the atmospheric side inclined surface 56.

The grease for use in the present embodiment contains at least one of a synthetic hydrocarbon oil and a mineral oil as a base oil. The grease preferably contains a synthetic hydrocarbon oil as the base oil. Examples of synthetic hydrocarbon oils include poly-α-olefins, ethylene-α-olefin copolymers, polybutenes, alkylbenzenes, and alkylnaphthalenes. Examples of mineral oils include paraffinic mineral oils, olefinic mineral oils and naphthenic mineral oils.

These synthetic hydrocarbon oils and mineral oils may be used singly or in mixture. The base oil content of the grease is preferably 60 to 90 wt %.

In addition, the grease may contain a thickener. Examples of the thickener include metal soaps and metal complex soaps. Examples of the metal soaps include lithium soaps, sodium soaps, potassium soaps, calcium soaps, barium soaps and aluminum soaps. Examples of the metal complex soaps include lithium complex soaps, calcium complex soaps, and barium complex soaps. These thickeners may be used singly or in mixture. The thickener content of the grease is preferably 5 to 50 wt %, and more preferably 10 to 40 wt %.

In addition, the grease may further contain additives such as other thickeners, antioxidants, rust inhibitors, corrosion inhibitors, extreme pressure agents, oiliness agents, solid lubricants, conductivity improvers, and the like, as needed.

Examples of the antioxidants include phenolic antioxidants such as 2,6-di-tert-butyl-4-methylphenol and 4,4'-methylenebis(2,6-di-tert-butylphenol); amine type antioxidants such as alkyldiphenylamines, triphenylamines, phenyl-α-naphthylamines, alkylated phenyl-α-naphthylamines, phenothiazines, alkylated phenothiazines and; furthermore, phosphoric acid type antioxidants, sulfur type antioxidants and the like.

Examples of the rust inhibitors include fatty acids, fatty acid metal salts, fatty acid amines, alkylsulfonic acid metal salts, alkylsulfonic acid amine salts, oxidized paraffins, polyoxyethylene alkyl ethers, and the like.

Examples of the corrosion inhibitors include penzotriazoles, benzimidazoles, thiadiazoles, and the like.

Examples of the extreme pressure agents include phosphorus-based compounds such as phosphoric acid esters, phosphorous acid esters, and phosphoric ester amine salts; sulfur compounds such as sulfides and disulfides; sulfur-based metal salts such as dialkyldithiophosphoric acid metal salts and dialkyldithiocarbamic acid metal salts; chlorinated compounds such as chlorinated paraffins and chlorinated diphenyl; and the like.

Examples of the oiliness agents include fatty acids or esters thereof, higher alcohols, polyhydric alcohols or esters thereof, aliphatic esters, aliphatic amines, fatty acid monoglycerides, a montan wax, an amide-based wax, and the like.

Examples of the solid lubricants include molybdenum disulfide, carbon black, graphite, boron nitride, silane nitride, melamine cyanurate, and the like.

In addition, the worked penetration of the grease is preferably 265 to 295. Note that the worked penetration is measured at 25° C. based on JIS K 2220.

Further, the low temperature starting torque of the grease is 25 N·cm or less. Furthermore, the low temperature starting torque of the grease is preferably 12 N·cm or less. When the low temperature starting torque exceeds 25 N·cm, the fluidity decreases in a low temperature environment. This leads to insufficient action as the lubricant in an assembled state of the sealing apparatus 1 in a low temperature environment, which is not preferable because this promotes wear of the seal lip portion 51 of the sealing apparatus 1. Note that the low temperature starting torque is measured at −30° C. based on JIS K2220.

In the following, the usage state of the sealing apparatus 1 having the configuration described above will be described. The sealing apparatus 1 according to the present embodiment is assumed to be disposed between two mutually relatively rotatable members, namely, a crankcase and a crankshaft of an automobile engine. Specifically, the sealing apparatus 1 is assumed to be disposed in a gap and to seal the gap between a shaft hole of the crankcase and the crankshaft inserted into the shaft hole. Note that the sealing apparatus 1 according to the present disclosure is not limited to the one disposed between a crankshaft and a crankcase of an automobile engine. The sealing apparatus 1 according to the present disclosure can be applied to seal a gap between two mutually relatively rotatable members in a vehicle or a general-purpose machine.

Figure 2:
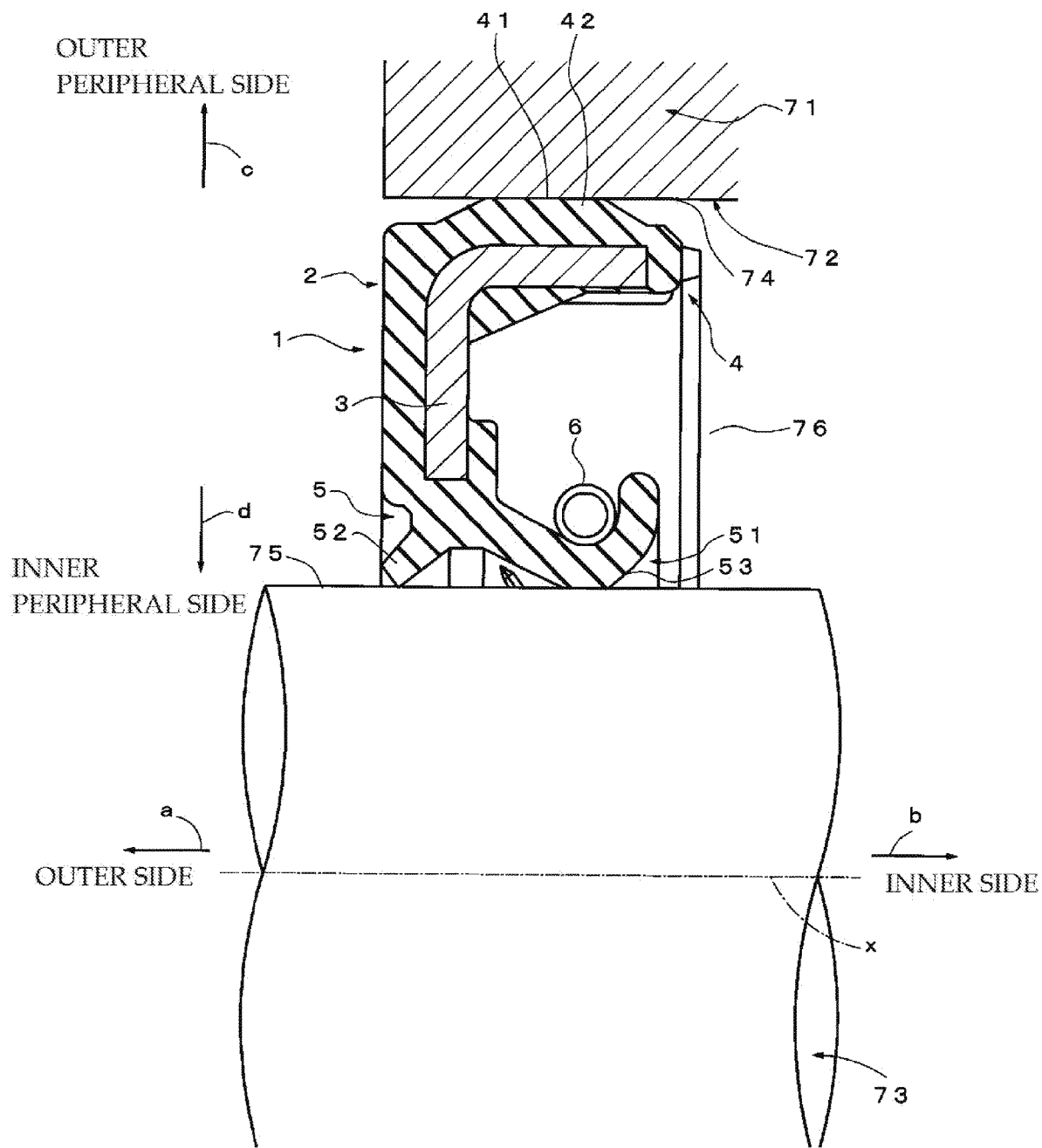
FIG. 2 is a partial sectional diagram for illustrating a usage state of the sealing apparatus according to the embodiment of the present disclosure.
Figure 3:
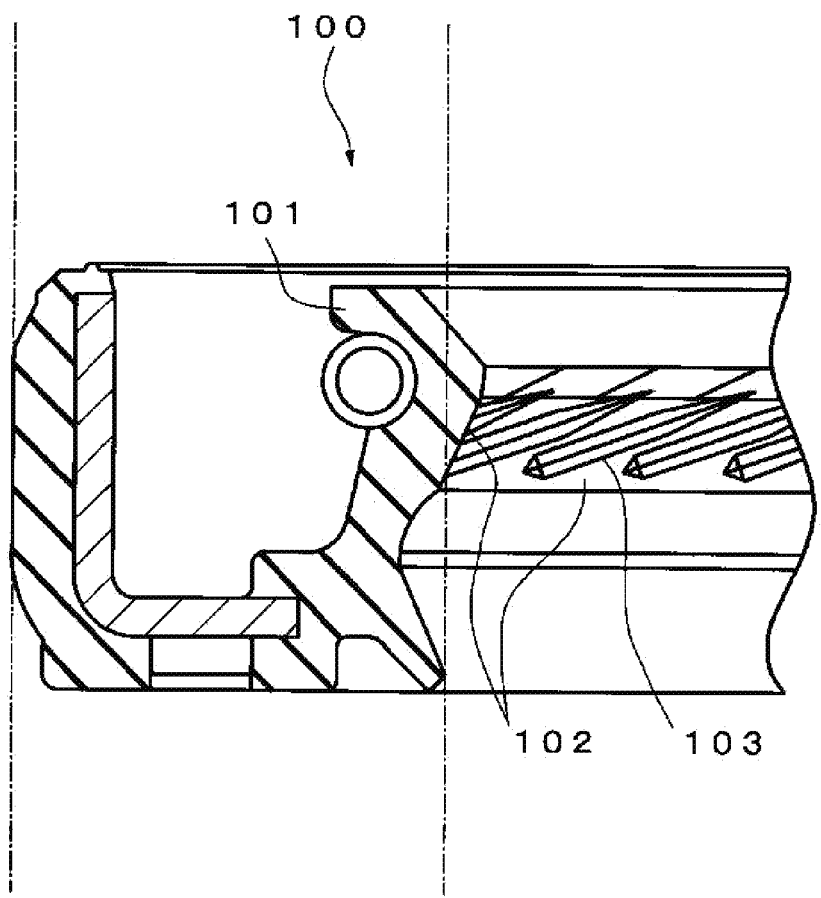
FIG. 3 is a sectional diagram for illustrating the configuration of a conventional sealing apparatus.

FIG. 2 is a partial sectional diagram for illustrating the usage state of the sealing apparatus 1 according to the embodiment of the present disclosure.

As illustrated in FIG. 2, a crankcase 71 includes a shaft hole 72 as a cylindrical opening. A crankshaft 73 is inserted into the shaft hole 72. The sealing apparatus 1 is attached to a gap 76 and to seal the gap 76 between an inner peripheral surface 74 which is a surface on an inner periphery of the shaft hole 72 and an outer peripheral surface 75 which is a surface of the crankshaft 73. Note that the grease G has been applied to the seal lip portion 51 in advance.

Specifically, the sealing apparatus 1 is attached to the crankcase 71 such that the attaching portion 4 is fitted into the shaft hole 72 of the crankcase 71. More specifically, the interference portion 42 of the attaching portion 4 is compressed between the reinforcing ring 3 and the inner peripheral surface 74 of the shaft hole 72, and then the sealing apparatus 1 is fitted and strongly fixed to the crankcase 71. The outer peripheral surface 41 of the elastic body portion 2 closely contacts the inner peripheral surface 74 of the shaft hole 72 in a liquid-tight manner. The crankshaft 73 is inserted into the seal portion 5, and the lip tip portion 53 (sliding surface 55) of the seal lip portion 51 contacts the outer peripheral surface 75 of the shaft 73. The gap 76 is sealed by the fitting of the attaching portion 4 and the contacting of the lip tip portion 53.

As described above, according to the sealing apparatus 1 of the embodiment of the present disclosure, grease is applied to the seal lip portion 51 and thus the wear of the seal lip portion 51 due to sliding can be suppressed. In particular, the grease contains at least one of a synthetic hydrocarbon oil and a mineral oil as a base oil and the grease has a low temperature starting torque of 25 N/cm or less, and thus the fluidity of grease is high even in a low temperature environment and the effect of suppressing the wear of the seal lip portion 51 is considerable. The suppression of the wear of the seal lip portion 51 can prevent leakage of the sealed fluid.

Hereinbefore, the embodiments of the present disclosure have been described, but the present disclosure is not limited to the above embodiments of the present disclosure and may include all aspects included in the concept of the present disclosure and the scope of the claims. Further, the above components may be combined appropriately and selectively to solve at least a part of the above problems and to exert at least a part of the above effects. For example, the shape, material, arrangement, size, and the like of each component in the above embodiments can be appropriately changed according to a specific application of the present disclosure. Specifically, the shapes of the attaching portion 4, the seal portion 5, and the reinforcing ring 3 are not limited to the above shapes.

EXAMPLES

Hereinafter, examples of the present disclosure will be described.

A rear differential side oil seal which is an acrylic rubber oil seal having an inner diameter of 37 mm was used as sealing apparatus according to present examples and comparative examples. In addition, greases used in the sealing apparatus according to the present examples 1 to 3 and the comparative examples 1 to 3 were listed in Table 1 to be described later.

To be the mixing ratio in Table 1, a base oil and a thickener were mixed and kneaded using a three-roll mill to obtain a uniform grease (examples 1 to 3, comparative examples 1 to 3). Table 1 lists the evaluation results of grease. The content of each component in Table 1 is represented by "wt %".

[Preparation of Grease]
Base Oil
Synthetic hydrocarbon oil A: poly-α-olefin (kinematic viscosity of 18 mm$^2$/s at 40° C.)
Synthetic hydrocarbon oil B: poly-α-olefin (kinematic viscosity of 30 mm$^2$/s at 40° C.)
Mineral oil A: paraffinic mineral oil (kinematic viscosity of 140 mm$^2$/s at 40° C.)
Mineral oil B: paraffinic mineral oil (kinematic viscosity of 84 mm$^2$/s at 40° C.)
Fluorine oil: perfluoropolyether (kinematic viscosity of 160 mm$^2$/s at 40° C.)
Thickener
Lithium soap: Li salt of fatty acid monocarboxylic acid having 12 to 24 carbon atoms (it is noted that one contains at least one hydrogen group or one contains no hydrogen group)
Barium complex soap: complex soap of fatty acid dicarboxylic acid and monoaminocarboxylic acid.
PTFE
[Evaluation of Grease]
Low Temperature Starting Torque
The low temperature starting torque was measured according to JIS K2220 at −30° C.
Wear Width
Grease was applied to a sliding surface of an acrylic rubber oil seal having an inner diameter of 37 mm and was subjected to a rotation test at −30° C. The rotation test was performed in a state in which a lubricating oil (mineral oil gear oil having a viscosity grade of 75 W-90 and a pour point of −23° C.) was filled up to the center of the rotating shaft. 100 cycles were repeated, assuming that one cycle refers to a pattern of rotating at a low temperature of −30° C. for 10 minutes in the normal rotation direction, then stopping and cooling. Then, the wear width of the sliding surface was observed with a microscope. A wear width of 0.5 mm or less was accepted, and a wear width of more than 0.5 mm was rejected.

TABLE 1

|  |  | Example 1 | Example 2 | Example 3 | Comparative Example 1 | Comparative Example 2 | Comparative Example 3 |
|---|---|---|---|---|---|---|---|
| Base oil | Synthetic hydrocarbon oil A | 84 |  | 65 |  |  |  |
|  | Synthetic hydrocarbon oil B |  | 67 |  |  | 84 |  |
|  | Mineral oil A |  |  | 22 |  |  |  |
|  | Mineral oil B |  |  |  | 92 |  |  |
|  | Fluorine oil |  |  |  |  |  | 75 |

TABLE 1-continued

|  |  | Example 1 | Example 2 | Example 3 | Comparative Example 1 | Comparative Example 2 | Comparative Example 3 |
|---|---|---|---|---|---|---|---|
| Thickener | Lithium soap | 16 |  | 13 | 8 | 16 |  |
|  | Barium complex soap |  | 33 |  |  |  |  |
|  | PTFE |  |  |  |  |  | 25 |
| Low temperature starting torque (N · cm) |  | 8 | 12 | 9.8 | 86 | 29 | 8.8 |
| Wear width (mm) |  | 0.5 | 0.5 | 0.4 | 1.0 | 1.2 | 0.8 |

It was found from Table 1 that the wear was suppressed under a condition at −30° C. in the examples 1 to 3 of applying grease containing at least one of a synthetic hydrocarbon oil and a mineral oil as the base oil and having a low temperature starting torque of 25 N/cm or less. Meanwhile, it was found that the wear width of the sliding surface was larger in the comparative examples 1 and 2 where the low temperature starting torque was more than 25 N·cm. In addition, it was found that the wear width of the sliding surface was large in the comparative example 3 where the low temperature starting torque was 25 N·cm or less but the grease containing fluorine oil as the base oil (not containing a synthetic hydrocarbon oil or a mineral oil) was used.

As described above, in the examples 1 to 3 according to the present disclosure, the grease applied to the seal lip portion contains a synthetic hydrocarbon oil as the base oil and has a low temperature starting torque of 25 N·cm or less, whereby a considerable effect of suppressing the wear of the seal lip portion is exerted even in a low temperature environment of −30° C.

What is claimed is:

1. A sealing apparatus sealing a gap between a first and second member mutually relatively rotatable about an axis in an internal combustion engine, the sealing apparatus comprising:

an elastic body portion which is an elastic body including an annular attaching portion attached to the first member and centered about the axis, and a seal portion in close contact with the second member in a manner in which the second member is slidable, wherein the seal portion comprises: an annular seal lip portion centered about the axis; and an annular dust lip centered about the axis on an atmospheric side on an opposite side of a sealed fluid side with respect to the seal lip portion, wherein the seal lip portion comprises a lip tip portion which is an annular projecting body projecting toward the axis, and grease is applied to the seal lip portion, the grease contains at least one of a synthetic hydrocarbon oil and a mineral oil as a base oil and has a low temperature starting torque of 25 N·cm or less at −30° C. so as to suppress wear of the seal lip portion to a value of 0.5 mm or less in a low temperature environment.

2. The sealing apparatus according to claim 1, wherein that the grease is applied between the lip tip portion and the dust lip.

3. The sealing apparatus according to claim 2, wherein the lip tip portion comprises: a sealed fluid side inclined surface which is an inclined surface on the sealed fluid side; an atmospheric side inclined surface which is an inclined surface on the atmospheric side; and a sliding surface contacting the second member between the sealed fluid side inclined surface and the atmospheric side inclined surface in a manner in which the second member is slidable, wherein the grease is applied to at least the sliding surface.

4. The sealing apparatus according to claim 3, wherein the grease is applied to at least the sliding surface of the lip tip portion and the atmospheric side inclined surface.

* * * * *